United States Patent [19]

Timm

[11] 4,444,961

[45] Apr. 24, 1984

[54] PROCESS AND APPARATUS FOR PREPARING UNIFORM SIZE POLYMER BEADS

[75] Inventor: Edward E. Timm, Coleman, Mich.

[73] Assignee: The Dow Chemical Company, Midland, Mich.

[21] Appl. No.: 398,007

[22] Filed: Jul. 14, 1982

Related U.S. Application Data

[63] Continuation-in-part of Ser. No. 283,779, Jul. 16, 1981, abandoned, which is a continuation-in-part of Ser. No. 202,265, Oct. 30, 1980, abandoned.

[51] Int. Cl.³ .............................................. C08F 2/56
[52] U.S. Cl. ........................................ 526/88; 521/38
[58] Field of Search ...................... 526/88; 521/29, 31, 521/33

[56] References Cited

U.S. PATENT DOCUMENTS

| | | | |
|---|---|---|---|
| 2,606,174 | 8/1952 | Kolthoff | 526/88 |
| 2,618,626 | 11/1952 | VanDijk et al. | 260/82.3 |
| 2,719,143 | 9/1955 | VanDijk et al. | 260/86.3 |
| 2,813,850 | 11/1957 | VanDijk et al. | 260/92.8 |
| 3,042,970 | 7/1962 | Terenzi | 18/47.3 |
| 3,204,934 | 9/1965 | Graham et al. | 259/4 |
| 3,226,092 | 12/1965 | Graham et al. | 259/2 |
| 3,243,357 | 3/1966 | Torobin | 196/14.5 |
| 3,488,159 | 1/1970 | Moon et al. | 23/270.5 |
| 3,617,584 | 11/1971 | Flack et al. | 264/5 |
| 3,872,067 | 3/1975 | Hrris | 521/31 |
| 3,922,255 | 11/1975 | Koestler et al. | 260/80.78 |
| 3,997,145 | 12/1976 | Benson | 259/2 |
| 4,017,670 | 4/1977 | Spicuzza | 526/88 |
| 4,071,670 | 1/1978 | Vanzo | 526/88 |
| 4,101,460 | 7/1978 | Small | 521/29 |
| 4,246,354 | 1/1981 | Herbin | 521/33 |

FOREIGN PATENT DOCUMENTS

5619 11/1979 European Pat. Off. .

*Primary Examiner*—Paul R. Michl

[57] ABSTRACT

Spheroidal polymer beads having a uniform size are prepared by polymerizing uniformly sized monomer droplets formed by the vibratory excitation of a laminar jet of monomeric material flowing in a continuous liquid medium containing a suitable suspending agent. For example, a laminar jet of a monomer mixture comprising a monovinylidene aromatic such as styrene, a polyvinylidene aromatic such as divinylbenzene and a polymerization initiator can be subjected to vibratory excitation and the resulting monomer droplets polymerized to yield copolymer beads having a narrow particle size range distribution. The resulting copolymer beads can be employed to prepare high yields of ion exchange resins exhibiting superior properties, particularly in continuous ion exchange operations.

34 Claims, 3 Drawing Figures

Fig. 3

PROCESS AND APPARATUS FOR PREPARING UNIFORM SIZE POLYMER BEADS

CROSS-REFERENCE TO RELATED APPLICATIONS

This application is a continuation-in-part of copending application Ser. No. 283,779, filed July 16, 1981, abandoned, which is a continuation-in-part of co-pending application Ser. No. 202,265, filed Oct. 30, 1980, now abandoned.

BACKGROUND OF THE INVENTION

The present invention relates to the preparation of spheroidal polymer beads, particularly to a method and apparatus for preparing spheroidal polymer beads having a relatively uniform particle size.

A wide variety of polymers including polymers of a monovinylidene aromatic such as styrene or esters of an unsaturated carboxylic acid such as acrylic or methacrylic acid esters are prepared in spheroidal bead form using suspension polymerization techniques. Conventionally, suspension polymerization consists of dispersing a monomer as droplets in a vessel equipped with an agitator and containing a continuous phase in which the monomers and resulting polymer are essentially insoluble. The dispersed monomer droplets are subsequently polymerized while maintaining continuous agitation.

Unfortunately, the spheroidal polymer beads prepared by conventional suspension polymerization techniques exhibit a relatively broad particle size distribution. This is generally undesirable for the reason that spheroidal polymer beads employed in most applications advantageously exhibit a generally uniform particle size. For example, the ion exchange resins prepared from copolymer beads of a monovinylidene aromatic and a polyvinylidene aromatic advantageously exhibit a narrow particle size distribution to provide the desired flow characteristics to an ion exchange resin bed comprising said resin. Therefore, a significant percentage of the polymer beads prepared using conventional suspension polymerization techniques possess particle sizes undesirable for their intended application. Such undesirably sized beads are normally wasted or employed in applications of less economic desirability.

Heretofore, various suspension stabilizers (suspending agents) have been employed to help improve the uniformity of the polymer beads prepared using conventional suspension polymerization techniques. (See, for example, U.S. Pat. Nos. 3,728,318 and 3,862,924.) While the suspending agents effectively maintain the monomer droplets in suspension, they do not substantially reduce the broad particle size distribution obtained when the monomer is suspended in the continuous polymerization medium.

Alternatively, various modifications in the suspension polymerization process have been proposed to prepare more uniformly sized polymer beads. For example, U.S. Pat. No. 2,694,700, in describing a method for the continuous suspension polymerization of vinyl compounds, teaches the coalescence of the suspended monomer droplets can be reduced by introducing substantial amounts of the polymer being prepared to the monomer prior to its suspension in the polymerization medium. Although effective in reducing coalescence of the suspended droplets, an undesirably broad particle size distribution is obtained in suspending the monomer as droplets in the polymerization medium, thereby causing the resulting polymer beads to possess a relatively broad particle size distribution.

U.S. Pat. No. 2,932,629 reports that polymer beads of a relatively uniform size can be formed by dispersing the polymerizable monomers as droplets having a smaller size than the desired size of the polymer beads to be prepared therefrom and allowing the limited coalescence of the dispersed monomer droplets until they reach the desired size. The resulting suspension is then stabilized and the monomers polymerized to form polymer beads. Unfortunately, the disclosed method requires careful control, particularly during the limited coalescence of the monomer droplets, to obtain polymer beads having desired particle sizes.

In yet another method for preparing uniformly sized beads, U.S. Pat. No. 3,922,255 proposes forming monomer droplets by jetting a mixture of a polymerizable monomer and a polymerization initiator through capillary openings into a column of a continuous aqueous phase containing a suspension stabilizer and partially polymerizing the thus formed monomer droplets. The polymerization of the partially polymerized droplets is subsequently completed in a reaction vessel which is specifically designed and equipped with an agitation means for the polymerization of the previously suspended monomer droplets. While the uniformity of the suspended monomer droplets can be increased using the proposed method, the particle size distribution is often sufficiently broad that an undesirably large portion of the final beads are wasted or must be employed in less economically desired applications. In addition, this process requires bulky and expensive equipment, is essentially a continuous process, and due to slow droplet formation, does not provide an economical means for preparing a suspension high in organic content such as is necessary for commercial production of copolymer beads.

In view of the stated deficiencies of the prior art methods for preparing uniformly sized polymer beads, it remains highly desirable to economically and efficiently prepare spheroidal polymer beads having improved uniformity.

SUMMARY OF THE INVENTION

Accordingly, in one aspect, the present invention is a method for preparing spheroidal polymer beads. In said method, a monomer jet having laminar flow characteristics is formed by flowing a monomer phase comprising a polymerizable monomer through an opening into a continuous phase comprising a liquid immiscible with the polymerizable monomer or monomer phase and containing a stabilizing amount of a suspending agent. The monomer jet is vibratorily excited at conditions sufficient to break the jet into droplets comprising the polymerizable monomer and spheroidal polymer beads prepared from the polymerizable monomer by subsequently polymerizing the monomer in suspension at conditions which do not cause significant coalescence or additional dispersion thereof.

In another aspect, the present invention is an apparatus for preparing spheroidal polymer beads. The apparatus comprises (1) a monomer reservoir containing a monomer phase comprising a polymerizable monomer, (2) a column containing a continuous phase of a suspending liquid immiscible with the polymerizable monomer or monomer phase and a stabilizing amount of a suspending agent, (3) a monomer jet forming means in intimate contact with the monomer phase and the continuous liquid phase and having an opening connecting the monomer reservoir with the column containing the continuous phase such that the monomer phase passing therethrough into the continuous phase is capable of being a jet having laminar flow characteristics, (4) a vibratory exciter capable of vibratorily exciting the laminar flow jet of the monomer phase such that the monomer jet is broken into droplets and (5) a means for polymerizing the monomer in suspension at conditions such that significant coalescence or additional dispersion of the monomer droplets does not occur.

In yet another aspect, the present invention is a suspension polymerization product in the form of spheroidal polymer beads, which polymer beads have a particle size prior to the mechanical separation thereof wherein at least about 90 volume percent of the beads possess a particle size from about 0.9 to about 1.1 times the volume average particle size of said beads.

Surprisingly, by the practice of the present invention, monomer droplets exhibiting exceptionally uniform, e.g., the monomer droplets having a coefficient of variance (i.e., twice the standard deviation divided by the arithmetic mean) of less than about 0.05, can be formed. Although the droplets are known to collide with one another immediately upon formation, the droplets unexpectedly exhibit minimum coalescence and spheroidal polymer beads having an unexpectedly uniform particle size can be prepared. For example, spheroidal polymer beads can be prepared by the practice of the present invention having a sufficiently uniform particle size such that about 90 volume percent of the beads possess a particle diameter from about 0.9 to about 1.1 times the volume average particle diameter of the beads. Conversely, using conventional suspension polymerization techniques, less than about 30–40 volume percent of beads are found to exhibit such uniform particle size. Moreover, the spheroidal polymer beads prepared by the method of this invention generally exhibit the other properties desired of polymers prepared in bead form, e.g., the beads employed in the subsequent preparation of ion exchange resins are not excessively cracked or spalled.

Therefore, the method and apparatus of the present invention are useful in the preparation of uniformly sized spheroidal polymer beads from polymerizable monomers, particularly monomers such as styrene and vinyl chloride which are polymerizable using conventional suspension polymerization techniques. The method and apparatus are particularly useful in the preparation of uniform size beads of a polymer of a monovinylidene aromatic and a cross-linking agent copolymerizable therewith, e.g., a polyvinylidene aromatic such as divinylbenzene, which beads are useful in the subsequent preparation of ion exchange resins. The ion exchange resins prepared therefrom exhibit superior properties, particularly in continuous ion exchange operations. Of specific interest are the use of said ion exchange resins in the separation of fructose from glucose wherein the maximum efficiency of each ion exchange bead is obtained, thereby causing unexpectedly superior results in said separation. In addition, the method of this invention is useful in the preparation of expandable polymer beads such as expandable polystyrene and in the preparation of seeded beads having a uniform particle size wherein the seeded beads are prepared from seed beads manufactured by the disclosed method.

BRIEF DESCRIPTION OF THE DRAWINGS

Understanding of this invention will be facilitated by referring to the accompanying drawings, in which.

DETAILED DESCRIPTION OF ILLUSTRATIVE EMBODIMENTS

Figures 1, 2:
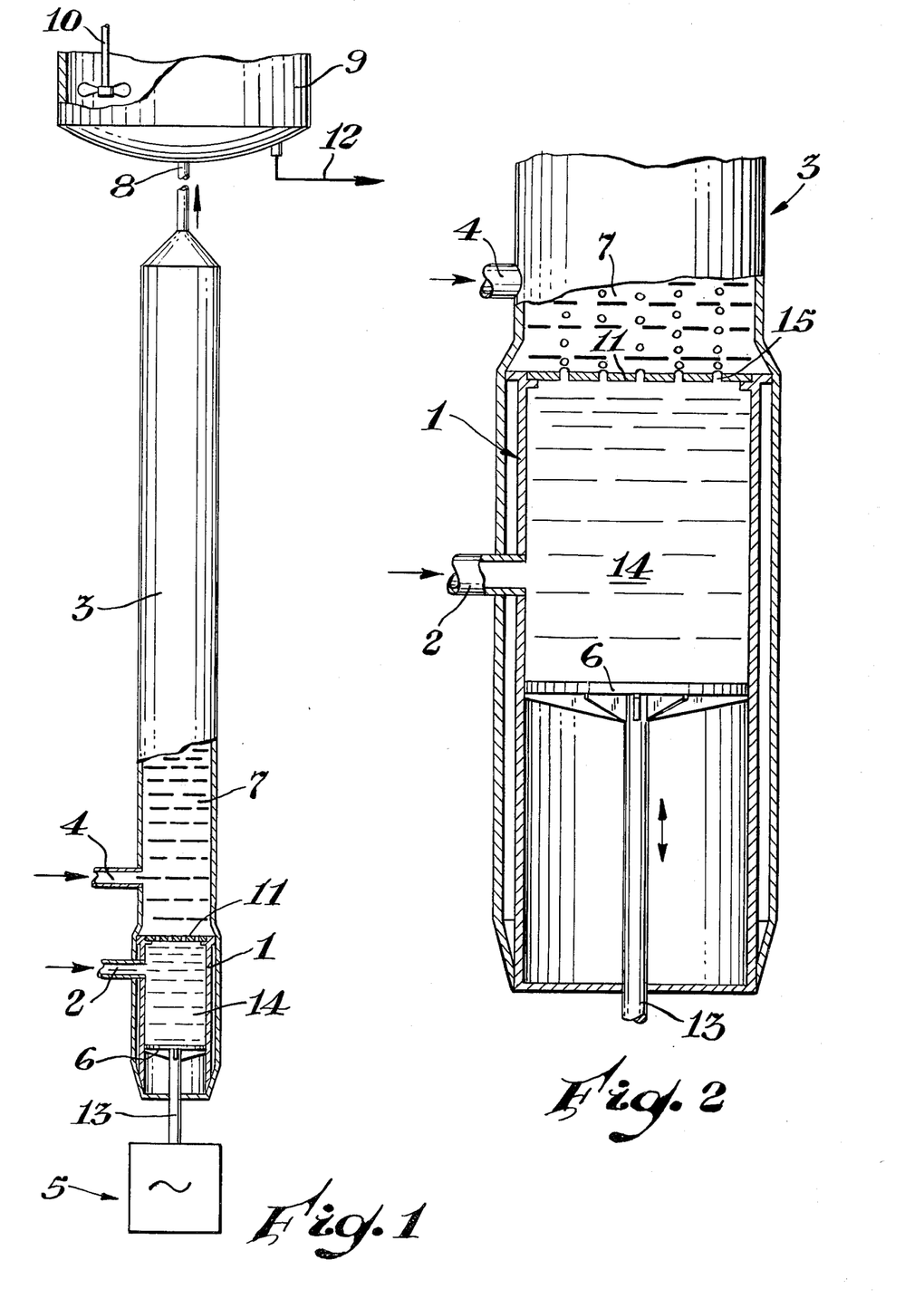
FIG. 1 is a schematic representation, partially in cross-section, which illustrates an embodiment of the present invention.
FIG. 2 is a schematic representation, partially in cross-section, illustrating in detail a portion of FIG. 1.

Referring now more particularly to the drawings, FIGS. 1 and 2 depict a monomer reservoir 1 which contains a monomer phase 14 comprising a polymerizable monomer. The monomer reservoir communicates with a source of monomer (not shown) by means of monomer feed conduit 2. Column 3 contains a continuous phase 7 of a suspension medium comprising a suspending liquid immiscible with the monomer or monomer phase in reservoir 1 and a stabilizing amount of a suspending agent. Column 3 communicates with a source (not shown) of the suspension medium by means of suspending liquid supply conduit 4.

A monomer jet forming means such as orifice plate 11 is in intimate contact with the monomer phase contained by reservoir 1 and the continuous liquid phase of column 3. Orifice plate 11 has a passage or, more typically as depicted by the Figures, a plurality of passages 15 connecting the monomer and continuous liquid phases. A means for vibratorily exciting the laminar flow jet comprises a piston 6 or similar means such as a diaphragm which is in intimate contact with the monomer phase in reservoir 1. As depicted in the Figures, piston 6 is mechanically connected by rod 13 to a variable-frequency vibrator or oscillator 5 in a manner such that piston 6 vibrates at the frequency generated by vibrator 5.

An effluent conduit 8 is provided at or near the end of column 3 opposite the monomer reservoir 1 to transfer the monomer droplets and any excess liquid from column 3 to polymerization reactor 9 equipped with an agitation means such as agitator 10. The reactor 9 is fitted with polymer product removal line 12.

In operation, the monomer phase 14 comprising a polymerizable monomer, including mixtures of one or more copolymerizable monomers and mixtures of one or more copolymerizable monomers with a non-polymerizable material, e.g., inert porogenic or pore-forming material, prepolymer or the like, is introduced into monomer reservoir 1 through conduit 2. In general, the monomer phase 14 includes a polymerization initiator suitable for initiating the polymerization of the monomer. The monomer phase is fed into reservoir 1 at a rate such that the monomer phase is forced through the passages 15 of jet forming means 11 into the suspending medium 7 contained by column 3 at a rate sufficient to form a jet having laminar flow characteristics. In this invention, the flow characteristics of the monomer jet are described by the dimensionless Reynolds number (Re) said Reynolds number being defined as the product of the density of the monomer phase ($p$), including the polymerization initiator and other additional materials, expressed in grams per cubic centimeter (g/cm³), the mean jet velocity (v) of the monomer phase expressed in centimeters per second (cm/sec) and the diameter (d), expressed in centimeters (cm) of the opening through which the monomer is flowed divided by the viscosity (μ) of the monomer phase expressed in poise $$\left(\text{i.e., } Re = \frac{\rho v d}{\mu}\right).$$

The Reynolds number of the monomer jet in this invention must be sufficiently high that the jet has laminar flow characteristics. In addition, the Reynolds number of the monomer jet must be sufficiently low that the jet does not create turbulent flow conditions which significantly impair the uniformity in droplet size. In general, monomer jets having a Reynolds number in the range from about 1 to about 2000 exhibit laminar flow characteristics yet do not create a turbulent flow which impairs the uniformity in droplet size.

Preferably, the monomer jet exhibits flow characteristics defined by a Reynolds number from about 5 to about 1,200, more preferably from about 120 to about 1,200, most preferably from about 225 to about 700.

As the thus-formed monomer jet flows into the continuous phase, the jet is vibratorily excited at a frequency which breaks the jet into droplets. In general, the monomer jet is excited at conditions such that generally uniform sized droplets are prepared. By the term "generally uniform" is meant that the droplets exhibit a particle size distribution having a coefficient of variance of less than 0.1. In the practice of this invention, droplets having such monomodal distribution are prepared by vibratorily exciting the monomer jet at constant vibrational characteristics defined by the dimensionless Strouhal number (St) from about 0.05 to about 5 wherein the Strouhal number is the product of $2\pi$, the frequency (f) of the vibration expressed in hertz (hz) and the diameter (d), expressed in cm, of the opening through which the monomer is flowed divided by the mean jet velocity (v) of the monomer phase expressed in cm/sec $$\left(\text{i.e., } St = \frac{2\pi f d}{v}\right).$$

As depicted in the Figure, such vibrational excitation can be provided by the variable-frequency vibrator and transmitted to the monomer phase by piston 6.

The excitation of such monomer jet is preferably conducted at vibrational conditions defined by a Strouhal number from about 0.15 to about 1.5, preferably from about 0.4 to about 1.2.

The specific conditions at which the droplets are formed, i.e., the flow characteristic of the monomer jet and vibratory excitement thereof, which are most advantageously employed herein depend on a variety of factors, particularly the desired size and uniformity, i.e., particle size distribution, of the monomer droplets and the resulting spheroidal polymer beads. In general, the monomer droplets are preferably prepared having a particle size distribution such that the coefficient of variance thereof is less than about 0.07, more preferably less than about 0.05. Most preferably, the coefficient of variance of the particle size of the monomer droplets is negligible, i.e., less than about 0.01. At the formation of monomer droplets having such uniformity, the subsequent polymerization of the monomer at conditions which do not cause significant coalescence or additional dispersion will give spheroidal polymer beads having a particle size such that at least about 50 volume percent of said beads have a particle diameter from about 0.9 to about 1.1 times the volume average particle diameter of the beads. Advantageously, at least about 80, preferably at least about 90, more preferably at least about 95, volume percent of the beads exhibit such particle size, wherein particle size is measured employing conventional techniques such as described in the Examples. The Strouhal and Reynolds numbers which impart such uniformity to the monomer droplets and the subsequently prepared polymer beads will vary depending on the components of the monomer phase, including the types and amounts of monomers being employed, and the composition of the continuous suspending medium.

Figure 3:
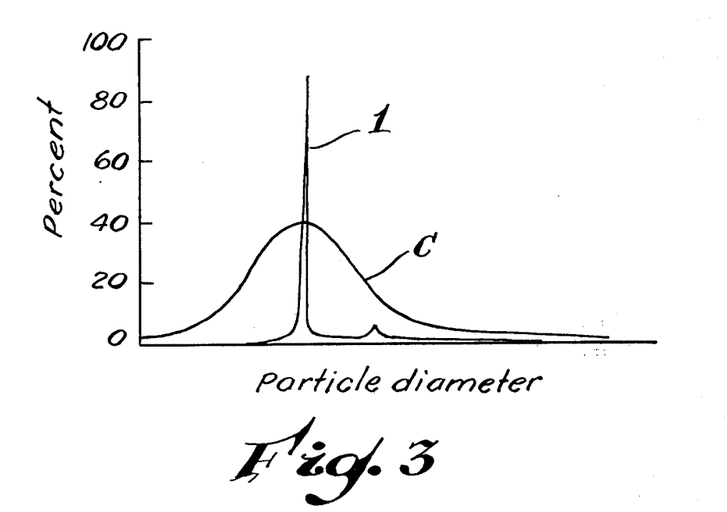
FIG. 3 is a graphical representation of the particle size distribution of spheroidal beads prepared by the method of the present invention as compared to the size distribution of beads prepared using conventional techniques.

At such conditions, droplets of the monomer phase equal in volume to the amount of the monomer phase flowing through the opening divided by the vibrationary frequency are prepared. By properly selecting the frequency and monomer flow rates, discrete particles of a mechanistically predetermined particle size can be prepared. Therefore, the particle size uniformity of the beads can be represented using this calculated, predetermined particle size by magnifying (at least 50× a statistically significant sample of beads (e.g., from at least 100 to about 1000 beads) and measuring the particle diameter of the magnified beads. At least about 70 percent, by number, of the beads in the statistical sample advantageously have a particle size which is from about 0.95 to about 1.05 times the predetermined size. Preferably, at least about 80, more preferably at least about 90, percent by number of the beads exhibit such particle size. Such uniformity is expressed graphically in FIG. 3 wherein curve C represents a typical particle size distribution of beads prepared using conventional suspension polymerization techniques and curve 1 represents the particle size distribution of beads prepared by the method of this present invention. Expressed alternatively, of the toal amount of beads, at least 80 percent by number (and preferably on a corresponding weight basis) preferably have a particle size between about 0.95 and about 1.05, inclusive, more preferably between about 0.97 and about 1.03, inclusive, times the number average particle size of the beads comprising the 80 percent portion. More preferably, at least about 90, most preferably at least about 95, percent by number of the beads exhibit such a uniform particle size when compared to the number average particle size of the beads comprising the corresponding 90 or 95 percent portion.

Alternatively, droplets having bimodal or essentially any other particle size distribution can be prepared by varying the vibrational characteristics as defined by the Strouhal number such as by varying the frequency of vibration or by employing an orifice plate having different size passages.

The suspending liquid, which liquid is immiscible with the monomer or monomer phase comprising the continuous phase of column 3, is introduced thereto by means of line 4. In general, sufficient amounts of suspending agent to stabilize the monomer droplets are added therewith. Alternatively, the suspending agent can be introduced separately into column 3, such as by different points of addition at various positions throughout column 3.

In those operations, such as depicted by the Figures wherein the monomer phase possesses a lower density than the density of the suspension medium, the monomer droplets are allowed to rise through the suspension medium for subsequent removal from the top of column 3 for transfer to the polymerization reactor 9 by transfer line 8. In such operations, the suspending liquid is advantageously introduced into column 3 in close proximity to the monomer reservoir 1, flowed upwardly and transferred from column 3 to the polymerization reactor in a cocurrent type operation. Alternatively, but less advantageous, in such operations the suspending liquid can be introduced at or near the end of a column such as column 3 opposite monomer reservoir 1 in a countercurrent type operation or the monomer droplets can be prepared in a suspension medium having a zero flow motion, i.e., the continuous liquid phase 7 contained by column 3 is static.

In various operations, the monomer phase may possess a higher density than the suspension medium and the monomer droplets are allowed to drop therethrough. In such operations, the suspending liquid may also be employed in cocurrent, countercurrent or zero flow motion, with cocurrent flow again being most advantageously employed.

In a typical operation, although the monomer can be partially polymerized as it moves through column 3, typically the conditions are maintained such that essentially no polymerization of monomer occurs prior to the transfer of the monomer droplets to the polymerization reactor 9. In general, the monomer and continuous phases are maintained at temperatures from ambient temperatures (e.g., from about 18° to about 25° C.) to about 70° C. To prevent substantial polymerization in the column and to most effectively employ the suspending agent, temperatures from about 40° to about 50° C. are most preferred. Both the monomer droplets and suspension medium are transferred to the polymerization reactor 9. The polymerization of the monomer is subsequently conducted employing conventional techniques which generally comprise batchwise polymerization techniques consisting of heating the monomer under free radical forming conditions, with the suspending liquid serving as the polymerization medium. In general, additional amounts of the same or a different suspending agent are advantageously added to polymerization reactor 9 to help maintain the uniform particle size of the droplets during polymerization. Upon completion of polymerization, the uniformly sized polymer beads are withdrawn from the polymerization vessel for subsequent recovery using conventional dewatering techniques such as filtration, centrifugation, decantation or the like.

With regard to the various components of the present invention, jet forming means 11 is suitably any means comprising a passage or, more generally, a plurality of passages through which the monomer phase can be passed at conditions such that a jet or plurality of jets of the monomer phase is formed having laminar flow characteristics. Although the jet forming means can consist of one or more capillary tubes, it is more advantageous to employ a plate or similar device having one or more passages, e.g., a perforated disc, wherein each passage is advantageously generally a cylindrical or slightly frusto-conical passage of the same dimensions. In general, the diameter of the passage openings can range from less than about 0.05 mm to greater than about 6 mm wherein diameter refers to that cross-section of the passage having the smallest diameter. The diameter of each opening is primarily determined by the desired size of the monomer droplets. Typically, the desired droplet size will vary from about 0.15 to about 5 mm, more typically from about 0.15 to about 1.5 mm, most typically from about 0.2 to about 1 mm. While the passage diameter which will produce this size droplet is dependent on a variety of factors including the physical properties, e.g., viscosity, density and surface tension, of the monomer and continous phases, and the conditions of the vibrational excitation, typically, passage diameters from about 0.06 to about 0.6, more typically from about 0.08 to about 0.4, mm are employed. Using passages having such diameters, the length of each passage, i.e., that distance through which the monomer phase contacts essentially the entire circumference of the passage, is advantageously less than about 10 times the diameter of the opening. Preferably, the length to diameter ratio (L/d) of the passages is from about 0.2 to about 2.

The passages in the orifice plate are spaced a sufficient distance apart from each other such that the formation mechanism required to prepare the uniformly sized monomer droplets and the stability of the resulting droplets are not significantly and deleteriously affected by the laminar jet and droplet formation of an adjacent jet. In general, interactions between the droplet formation of adjacent jets are not significant when a passage is spaced at a distance of at least about 20 times the diameter of each opening apart from the nearest passage thereto, when said distance is measured from the center of each passage. A minimum distance, center to center, of at least about 1 mm is preferred. In addition, modifications which minimize the effect of the adjacent monomer jets such as providing a protective cavity which protects each of the monomer jets until broken into droplets are often advantageously provided in the orifice plate.

Although the orifice plate can be prepared from a variety of materials including metal, glass, plastic or rubber, a perforated metal plate is preferably employed.

The vibration is suitably provided by any means which oscillates or vibrates at a frequency capable of exciting the monomer jet at vibrational characteristics such that the monomer jet is broken into droplets, preferably, droplets of a general uniform size. Although transverse excitation can be employed, the monomer jet is preferably subjected to longitudinal excitation. Generally, frequencies from about 70 to about 7,000, advantageously from about 100 to about 1,000 hertz, give the desired vibrational characteristics. In general, vibratory means such as mechanical, electroacoustic, hydroacoustic or electromagnetic vibrators and magnetoresistive transducers well known in the art can be employed herein. Electromagnetic vibrators are more generally preferred.

The monomer phase comprises one or more polymerizable monomers which forms a discontinuous phase dispersed throughout the suspension medium upon the formation of droplets thereof. Polymerizable monomers advantageously employed in the practice of this invention are polymerizable monomers or mixtures of two or more copolymerizable monomers which monomers or monomer mixtures are sufficiently insoluble in a liquid (which liquid may contain a surfactant) to form droplets upon the dispersion of the monomer therein. Monomers having only limited miscibility in water such as acrylonitrile can also be employed herein. Advantageously, the polymerizable monomers are monomers polymerizable using suspension polymerization techniques. Suspension polymerizable monomers are well known in the art and reference is made to *Polymer Processes*, edited by Calvin E. Schildknecht, published in 1956 by Interscience Publishers, Incorporated, New York, Chapter III, "Polymerization in Suspension" by E. Trommsdoff and C. E. Schildknecht, pp. 69-109 for purposes of illustration. In Table II on pp. 78-81 of Schildknecht are listed diverse kinds of monomers which can be employed in the practice of this invention. Of such suspension polymerizable monomers, of particular interest herein are the water-insoluble monomers including the monovinylidene aromatics such as styrene, vinyl naphthalene, alkyl substituted styrenes (particularly monoalkyl substituted styrenes such as vinyltoluene and ethyl vinylbenzene) and halo-substituted styrenes such as bromo- or chlorostyrene, the polyvinylidene aromatics such as divinylbenzene, divinyltoluene, divinyl xylene, divinyl naphthalene, trivinylbenzene, divinyl diphenyl ether, divinyl diphenyl sulfone and the like; halo olefins, particularly the vinyl halides such as vinyl chloride; esters of $\alpha,\beta$-ethylenically unsaturated carboxylic acids, particularly acrylic or methacrylic acid, such as methyl methacrylate and ethyl acrylate; vinyl acetate and mixtures of one or more of said monomers. Of said monomers, the monovinylidene aromatics, particularly styrene or a mixture of styrene with a monoalkyl substituted styrene; the polyvinylidene aromatics, particularly divinylbenzene; esters of $\alpha,\beta$-ethylenically unsaturated carboxylic acid, particularly methyl methacrylate or combinations thereof, particularly a mixture of styrene and divinylbenzene or styrene, divinylbenzene and methyl methacrylate are preferably employed herein.

Also included within the polymerizable monomers useful herein are those monomers which form a solution with a liquid, generally water, wherein the resulting solution is sufficiently insoluble in one or more other liquids, generally a water-immiscible oil or the like, such that the monomer solution forms droplets upon its dispersion in said other liquid. Representative of such monomers are water-soluble monomers which can be polymerized using conventional water-in-oil suspension (i.e., inverse suspension) polymerization techniques such as described by U.S. Pat. No. 2,982,749 which is hereby incorporated by reference, including ethylenically unsaturated carboxamides such as acrylamide, methacrylamide, fumaramide and ethacrylamide; aminoalkyl esters of unsaturated carboxylic acids and anhydrides; ethylenically unsaturated carboxylic acids, e.g., acrylic or methacrylic acid, and the like. Preferred of such monomers for use herein are the ethylenically unsaturated carboxamides, particularly acrylamide, and the ethylenically unsaturated carboxylic acids, particularly acrylic or methacrylic acid. The monomer phase of such water-soluble monomers will generally contain sufficient amounts of water to solubilize the monomer. In such cases, although the amounts of the monomer and water most advantageously employed will vary depending on many factors including the specific polymer and desired end use application, the monomer generally constitutes less than about 90 weight percent of the monomer phase. Preferably, these water-soluble monomers constitute from about 5 to about 80, more preferably from about 30 to about 55, weight percent of the monomer phase.

Although the monomers can be polymerized using free radical initiation such as UV light or heat, in general, the monomer or monomer mixture contains a chemical free radical initiator. Free radical polymerization initiators conventionally employed heretofore in the preparation of polymers from the hereinbefore described monomers are advantageously employed. For example, a monomer soluble free radical initiator such as a monomer soluble peroxygen, e.g., benzoyl peroxide, or azobisisobutyronitrile is advantageously employed in conjunction with the water-insoluble monomers conventionally prepared using suspension polymerization techniques. Similarly, a water-soluble free radical initiator such as the persulfates, hydrogen peroxides or hydroperoxides is advantageously employed in conjunction with the water-soluble monomers such as acrylamide. Conventional polymerization aids, e.g., chain transfer agents, chelating agents and the like, can also be included within the monomer phase. Pore-forming materials, i.e., those materials which impart a porous structure to the resulting polymer beads such as an organic material which forms a solution with the monomers and which does not dissolve the resulting polymer (e.g., aliphatic hydrocarbons such as hexane and isooctane) can also be included in the monomer phase.

The continuous liquid phase contained by column 3 is a suspension medium comprising (1) a suspending liquid immiscible with the polymerizable monomer or monomer phase and the polymer prepared therefrom and (2) a stabilizing amount of a suspending agent.

In the practice of this invention, the suspension medium is advantageously selected such that the droplets of monomer can readily be prepared at the hereinbefore specified conditions. In addition, the viscosity of the suspending medium is advantageously selected such that the formed monomer droplets can easily move therethrough. In general, the monomer droplets are easily prepared and move easily through the suspension medium when the viscosity of the suspending medium is less than about 1 poise. However, droplet formation is more readily achieved, and movement of the droplets through the suspension medium is easier when the viscosity thereof is substantially similar to, e.g., of the same order of magnitude as the viscosity of the monomer phase when said viscosities are expressed in centipoise units (cps) at room temperature. The viscosity of the suspending medium can also vary somewhat with the size of the monomer droplets to be formed. Larger monomer droplets move more readily through the suspension medium than do smaller monomer droplets. Accordingly, a higher viscosity suspending medium may be employed in the preparation of larger monomer droplets. Preferably, the suspension medium has a viscosity of less than about 50, more preferably less than about 10, cps which viscosity is from about 0.1 to about 10, preferably from about 0.2 to about 2, times the viscosity of the monomer phase.

In addition, the suspension medium advantageously has a sufficiently different density than the monomer phase to allow the droplets of monomer to rise or fall through the column. For example, when the droplets of monomer rise through the column to the polymerization reaction means, the density of the suspending medium is advantageously greater than the density of the monomer droplets, with the density of the suspension medium advantageously being more than about 1.02, preferably more than about 1.1, times the density of the monomer droplets. Alternatively, when the droplets of monomer are to descend through the suspension medium, the density of the suspension medium is less than the density of the monomer droplets, with the density of the suspension medium advantageously being less than about 0.98, preferably less than about 0.9, times the density of the monomer droplets.

The suspending liquid is suitably any inert liquid which is immiscible with the polymerizable monomer or monomer phase in which liquid the monomer or monomer phase is capable of being dispersed as droplets. By the term "immiscible" is meant that less than about 10 weight percent of the polymerizable monomer or monomer phase is miscible (or soluble) in the suspending liquid, i.e., the suspending liquid does not solvate more than about 10 weight percent of the monomer phase or polymerizable monomer. Preferably, less than about 1, more preferably less than about 0.1, weight percent of the monomer or monomer phase is miscible in the suspending liquid. In the normal practice of this invention, the suspending liquid will contain a suspending aid. Suitable suspending aids are those materials which enable the formation of the monomer phase into spheroidal droplets of a desired size and which hinder the coalescence or dispersion of the thus-formed droplets before or during polymerization of the monomer.

Typically, the suspending liquid advantageously employed with the hereinbefore described suspension polymerizable monomers is water or mixtures of water with one or more water-miscible organic liquids such as the lower alkyl alcohols such as methanol or butanol. Preferably, water is employed as the suspending liquid. Alternatively, when the monomer phase comprises a water-soluble monomer, a water-immiscible oil conventionally employed in the preparation of a water-in-oil suspension such as a halogenated hydrocarbon, e.g., methylene chloride, or a liquid hydrocarbon, preferably having from about 4 to about 15 carbon atoms, including aromatic and aliphatic hydrocarbons or mixtures thereof such as heptane, benzene, xylene, cyclohexane, toluene, mineral oils and liquid paraffins, e.g., kerosene and naptha are advantageously employed as the suspending liquid. In such case, the hydrocarbons are especially preferred.

Suspending agents most advantageously employed herein are dependent on the type and amount of monomer employed and the suspending medium. Suspending agents employed heretofore in conventional suspension polymerizations are advantageously employed herein. Representative of such suspending agents are gelatin, polyvinyl alcohol, starch, polyacrylic acids, including salts thereof such as sodium oleate, water-insoluble inorganic compounds such as magnesium silicate, cellulose ethers including the methylcelluloses, e.g., carboxymethyl methylcellulose and hydroxyethylcellulose, and the like.

Preferably, the suspending agent is a water-soluble polymer such as polyvinyl alcohol or carboxymethyl methylcellulose, which forms a film having a high interfacial tension around the monomer droplets. Such a suspending agent advantageously forms a film around the monomer droplets having an interfacial tension of at least about 3 dynes/cm$^2$. When larger droplets (i.e., droplets having a diameter of 400$\mu$ or more) are desired, the water-soluble polymeric suspending agent employed is preferably capable of forming a film having an interfacial tension of at least about 8 dynes/cm, more preferably at least 12 dynes/cm.

The aforementioned water-soluble polymeric suspending agents often increase the viscosity of the suspending medium. The rate at which the monomer droplets move through said suspending medium decreases with increasing viscosity of the suspending medium. Accordingly, it is desirable to select said water-soluble polymeric suspending agents such that the viscosity of an aqueous medium solution containing an amount of the suspending agent sufficient to stabilize the monomer droplets is within the ranges described hereinbefore. In general, small droplets will move through the suspending medium more slowly than larger droplets. Hence, the viscosity of the suspending medium may be higher when larger droplets are desired. Of the commonly employed water-soluble suspending agents, carboxymethylmethylcellulose is most preferred when larger droplets (i.e., droplets having a diameter of 400$\mu$ or more) are desired, and carboxymethylmethylcellulose and polyvinyl alcohol are most preferred for smaller droplets, with polyvinyl alcohol being especially preferred if the desired droplet size is less than about 250 microns.

In the practice of the present invention, the suspending medium contains a stabilizing amount of the suspending aid. By the term "a stabilizing amount" is meant an amount sufficient to maintain an essentially uniform dispersion of the monomer droplets in the suspending liquid following droplet formation until subsequent polymerization while preventing excessive coalescence or additional dispersion, i.e., the breaking of a droplet into a smaller size than the size of the originally formed droplet. Such amount of suspending aid will vary depending on the types and relative amounts of the monomer or monomers and the suspension medium and the specific suspending aid. In general, in the preparation of uniformly sized monomer droplets from the water-insoluble monomers, the suspending medium contains from about 0.05 to about 5, advantageously from about 0.075 to about 0.75, percent by weight of the suspending agent based on the total weight of the suspending liquid. Alternatively, the amount of suspending agent employed in the preparation of droplets of the more water-soluble polymers is typically from about 0.1 to about 10, advantageously from about 0.15 to about 1.5, weight percent based on the weight of the suspending liquid.

Although the amount of suspending agent employed to stabilize the monomer droplets is often sufficient to prevent substantial coalescence or additional dispersion of the droplets during subsequent polymerization, additional amounts of a suspending agent are often advantageously added to the polymerization reactor to help maintain a uniform size during polymerization. Such amounts of suspending agent most advantageously employed herein will vary depending on the type of suspending agent and the type and amounts of the monomer droplets. In general, an additional amount of suspending agent ranging from about 0.05 to about 5, advantageously from about 0.075 to about 0.75, weight percent of the total suspending liquid is added to the polymerization reactor.

Provided that uniform droplets of monomer can be prepared and the resulting monomers subsequently polymerized, the concentration of the continuous and monomer phases is not particularly critical to the practice of the present invention. In general, the amounts of the monomer and continuous phases most advantageously employed herein depend on a variety of factors including the composition of the monomer and continuous phases, particularly the monomer and suspending liquid employed. Typically, the concentration of the monomer phase advantageously varies, with the formation of the monomer droplets being conducted at lower monomer concentrations than the subsequent polymerization. The formation of the monomer droplets can be conducted at a monomer phase concentration varying from that concentration provided by the monomer phase jetted through a single passage or nozzle into a relatively large amount of the suspension medium to as much as 25 volume percent of the total volume of the monomer and continuous phases. Typically, however, the concentration of the monomer phase at the point of droplet formation ranges from about 0.01 to about 20, advantageously from about 1 to about 15 volume percent, wherein said volume percent is based on the total volume of the continuous and monomer phases. Alternatively, in the subsequent polymerization of the monomer, the polymerization medium advantageously comprises from about 30 to about 60, preferably from about 40 to about 55, volume percent monomer phase. Such change in the concentration of the monomer phase is readily accomplished by varying the relative feed rates of the monomer and continuous phases to column 3.

Advantageously, the monomer droplets are prepared at temperatures and conditions which minimize the polymerization reaction prior to or during droplet formation. For most monomers, ambient temperatures, e.g., temperatures from about 18° to about 25° C., are preferred for droplet formation. The resulting monomer is subsequently polymerized using conventional suspension polymerization techniques well known in the art. In general, such conventional techniques consist of exposing the droplets of monomer to polymerization at elevated temperatures under free radical forming conditions. Typically, temperatures from about 50° to about 100° C. are generally sufficient to cause polymerization of the monomer. During polymerization, which polymerization may be continuous or batchwise, sufficient agitation is provided to maintain a dispersion of the uniformly sized droplets and to provide adequate heat transfer, i.e., maintain a reasonably uniform temperature throughout the reaction medium.

The monomer droplets are advantageously polymerized in a polymerization vessel which is separate from the column in which the droplets are formed. By polymerizing the droplets in a separate polymerization vessel, sufficient agitation can be provided to maintain a dispersion of the uniformly sized droplets in the polymerization vessel without causing undesirable currents in the column which adversely affect the uniformity of the droplets being formed therein. Preferably, the monomer droplets move up or down through the column according to the relative density of the monomer phase and suspending medium in a zero-flow or cocurrent flow type operation. The droplets continue to rise or fall through the suspending medium out of the column and into the polymerization vessel. Most preferably, the droplets are flowed in a cocurrent type operation, the relative feed rates of the monomer phase and suspending medium to the column being selected such that the polymerization medium in the polymerization vessel comprises from about 30 to about 60 volume percent monomer phase.

Preferably, the movement of the monomer droplets through the column into the polymerization vessel is accomplished with little or no polymerization thereof. In general, the degree of polymerization of the monomer droplets before they are transferred to the polymerization vessel is less than a degree which causes significant gelation thereof. Advantageously, less than 10 weight percent, preferably less than about 2 weight percent of the monomers are polymerized before the droplets are transferred into the reaction vessel.

The polymerization reaction vessel is advantageously agitated to prevent significant coalescence or additional dispersion of the monomer droplets during the polymerization thereof. In general, the conditions of agitation are selected such that (a) the monomer droplets are not significantly resized by the agitation, (b) the monomer droplets do not significantly coalesce in the reaction vessel, (c) no significant temperature gradients develop in the suspension and (d) pools of monomer, which may polymerize to form large masses of polymer, are substantially prevented from forming in the reaction vessel. In general, the foregoing conditions are advantageously met using an agitator (paddle) such as described in Bates et al., "Impeller Characteristics and Power," *Mixing*, Vol. I, V. W. Uhl and J. B. Gray, Eds, published by Academic Press, New York (1966), pp. 116–118. Preferably, the agitator is of the anchor or gate types, as described on pp. 116–118 of Bates et al., or is of the "loop" or "egg beater" types, which are modifications of the anchor type agitator described in Bates et al. wherein a horizontal cross member is affixed to bars of the agitator at or near the ends of said bars. More preferably, the agitator bars extend up through the surface of the suspension, thereby preventing the formation of monomer pools on the surface of the suspension.

Upon completion of polymerization, the resulting suspension having beads comprising an aqueous solution of a water-soluble polymer, e.g., carboxamide polymer, dispersed throughout a continuous oil phase is a fluid liquid which is easily pumped or poured and which is readily employed by adding it to an aqueous liquid which inverts the emulsion to an aqueous solution of the polymer. In general, a water-soluble surface active agent such as an alkali metal, ammonium or amine soap of a fatty acid such as lauric, oleic or a comparable acid is advantageously employed. Further examples of such inverting surfactants and methods for their use are disclosed in U.S. Pat. No. 3,624,019 which is hereby incorporated by reference.

Alternatively, upon the completion of the polymerization, the resulting polymer beads which comprise a normally solid polymer are advantageously recovered by conventional dewatering techniques such as filtration. The recovered beads can then be further processed. For example, upon recovery, the spheroidal polymer beads of a monovinylidene aromatic and a polyvinylidene aromatic can be converted to ion exchange resins using techniques well known in the art for converting cross-linked, aromatic polymers to such resins.

Generally, anion resins are prepared by haloalkylating the cross-linked polymer and subsequently attaching anion active exchange groups to the haloalkylated polymer. Methods of haloalkylating the polymers and the haloalkylating agents employed in such methods are well known in the art and reference is made to U.S. Pat. Nos. 2,642,417; 2,960,480; 2,597,492; 2,597,493, 3,311,602 and 2,616,877 (all of which are hereby incorporated by reference) for purposes of illustration. A preferred haloalkylating agent is chloromethyl methyl ether. The anion resins, both weak and strong base resins, are prepared from the haloalkylated resins by techniques well known in the art. Illustrative of such techniques are U.S. Pat. Nos. 2,632,000; 2,616,877;

2,642,417; 2,632,001 and 2,992,544, all of which are hereby incorporated by reference. Typically, a weak base resin is prepared by contacting the haloalkylated polymer with ammonia, a primary amine such as methylamine or ethylamine, or a secondary amine such as dimethylamine at a temperature, generally from about 25° to about 150° C., sufficient to react the aminating agent with the halogen atom attached to the carbon atom alpha to the aromatic nucleus. Strong base resins are prepared in a similar manner using a tertiary amine such as trimethylamine or dimethylisopropanolamine as the aminating agent.

Chelate resins are also easily prepared from the cross-linked polymers by techniques well known in the art such as those described by U.S. Pat. Nos. 2,888,441 (wherein the haloalkylated polymer is aminated and the aminated polymer subsequently reacted with a suitable carboxyl containing compound, e.g., chloroacetic acid); 2,875,162; 3,337,480 or 4,031,038 (wherein the haloalkylated polymer is directly reacted with a suitable amino acid such as iminodiacetic acid or glycine or an aminopyridine such as 2-picolylamine or N-methyl-2-picolylamine).

Illustrative of the well-known methods for converting the cross-linked polymers to cation resins are U.S. Pat. Nos. 3,266,007; 2,500,149; 2,631,127; 2,644,801 and 2,764,564; all of which are incorporated by reference. Typically, strong acid cation exchange resins are prepared by sulfonating the polymer, which polymer is swollen in a swelling agent such as a sulfonation resistant chlorinated hydrocarbon (e.g., chlorobenzene or tetrachloroethylene) or an aliphatic or aromatic hydrocarbon (e.g., toluene or xylene) using sulfuric or chlorosulfuric acid or sulfur trioxide. Generally, the sulfonating agent is employed in amounts from about 2 to about 7 times the weight of the polymer and sulfonation conducted at temperatures from about 50° to about 200° C.

Alternatively, upon recovery, the spheroidal beads of various polymers, e.g., polystyrene, can be prepared as an expandable material. Although the blowing agent required to make such polymers expandable can be incorporated within the monomer phase prior to droplet formation, the beads are advantageously prepared without a blowing agent and the blowing agent subsequently incorporated therein. Conventional techniques well-known in the art and illustrated by the disclosure of U.S. Pat. Nos. 2,681,321; 2,744,291; 2,779,062; 2,888,410 and 3,468,820 are advantageously employed in the present invention. By such methods, the beads are suspended in water in a pressure vessel and the blowing agent, e.g., fluorocarbon gas, is introduced to the vessel. Using pressure and elevated temperatures, e.g., 80°–100° C., the beads absorb the gas.

The normally solid polymeric beads can also be employed in the preparation of seeded beads having a uniform particle size. In preparing said seeded beads, polymeric seed beads having uniform size, advantageously having a particle size from about 0.1 to about 1.0 mm, are prepared by the method of this invention, i.e., the seed beads are prepared at the desired size by breaking a monomer jet by vibratorily exciting the jet and subsequently polymerizing the resulting monomer droplets. Subsequent thereto, a polymerizable monomer is imbibed within the thus prepared seed bead and the imbibed monomer is then polymerized to form the uniform size seeded beads. If desired, the thus prepared seeded beads can subsequently be chemically modified such as by the attachment of active ion exchange groups by the techniques hereinbefore exemplified to form ion exchange resins. In the preparation of the seeded beads useful in preparing ion exchange resins, the seed bead advantageously comprises at least about 0.15, preferably at least about 0.2, and advantageously less than about 2, preferably less than about 1, weight percent of a polyethylenically unsaturated cross-linking agent, e.g., polyvinylidene aromatic, based on the total weight of monomers employed in preparing the seed bead. Of the monomer imbibed by the seed bead, the amount of polyethylenically unsaturated cross-linking agent employed can vary widely, with a polyethylenic monomer advantageously constituting from about 0.2 to about 8, preferably from about 2 to about 6, weight percent of the imbibed monomer. In general, the seed bead will constitute from about 1 to about 50, preferably about 5 to about 45, more preferably from about 10 to about 30, weight percent of the total dry weight of the seeded bead with the remainder of the seeded bead being composed of the monomer imbibed and subsequently polymerized in the seed bead.

The following examples are presented to illustrate the invention and should not be construed to limit its scope. All percentages and parts are by weight unless otherwise indicated.

EXAMPLE 1

The preparation of generally uniform sized spheroidal polymer beads of a copolymer of styrene and divinylbenzene is achieved using a vertically mounted stainless steel column which is 2 meters high and has an inside diameter of about 15 cm at a jet forming means (an orifice plate in this Example) and a diameter of 3.8 cm at the point at which the monomer droplets are fed to a polymerization vessel. At the base of this column is an orifice plate having 9 openings of a diameter of 0.29 mm and a length of 0.1 mm (L/d of 0.34). The orifice plate is prepared such that the openings are situated to form a square having 3 openings per side, with each opening being at least about 12 mm from the opening nearest thereto. Disposed beneath the orifice plate is a monomer reservoir connected to a monomer source. Disposed about 5 cm above the orifice plate is a piping connection communicating the column to a source of suspending medium.

A piston, disposed within the monomer reservoir, is connected by a rod to a variable frequency acoustic exciter commercially available under the trade designation of Model VG-100 by Vibration Test Systems. The walls of the monomer reservoir serve as the cylinder walls and the piston is employed to transmit the reciprocating motion produced by the exciter to the monomer mixture and laminar monomer jet.

A suspending medium (density $(\rho) = 1.0$ g/cc), comprising an aqueous solution of about 0.1 weight percent of a carboxymethyl methylcellulose suspending agent, fills the column and the polymerization vessel. The suspending medium is at room temperature and is maintained at this temperature throughout the column. Throughout the droplet formation, the suspending medium has a zero flow motion.

A monomer mixture $(\rho = 0.92$ g/cc) comprising 84 parts styrene, 8 parts divinylbenzene, 8 parts ethylvinylbenzene and 0.3 part of a peroxygen type free radical polymerization initiator (said weight percent being based on the total weight of styrene, divinylbenzene and polymerization initiator) is metered into the monomer reservoir at a constant rate of 45 grams per minute (g/min). This mixture is jetted through the openings in the orifice plate to form a jet having laminar flow characteristics defined by a Reynolds number of about 375. At the feed ratio specified, the monomer phase comprises about 0.01 volume percent of the volume of the monomer and continuous phases as it is broken into droplets. To break the monomer jets into uniformly sized droplets, the jets are vibratorily excited at a Strouhal number of 0.65, which corresponds to a frequency of vibration of a constant 520 cycles per second. The resulting uniformly sized droplets rise through the column due to their lower density than the dispersing medium. The average residence time of the monomer in the column is about 100 seconds. The monomer droplets flow from the upper end of the column into a polymerization reactor until a suspension comprising about 55 volume percent of unpolymerized monomer droplets based on the volume of the monomer and continuous phase is obtained. The polymerization reactor is equipped with an anchor type agitator operated at 90 rpm. Said agitator is centrally mounted, and the bars of said agitator are designed such that said bars are generally parallel to and proximate to the bottom and walls of the polymerization reactor. Sufficient amounts of additional carboxymethyl methylcellulose are added to the polymerization reactor to make a total concentration of the suspending agent of about 0.125 percent based on the weight of the suspending medium. The monomer is then polymerized by heating the reactor to about 75° C. for a period of about 12 hours while agitating the suspension at conditions which minimize the coalescence or additional dispersion of the droplets. At the end of this period, the resulting polymer beads are recovered free of the suspending medium using conventional filtration techniques. The recovered beads (Sample No. 1) are screened using conventional dry screening techniques using U.S. Standard Sieves designated No. 18, No. 20, No. 25, No. 30, No. 35, No. 40, No. 45 and No. 50. By such techniques, the beads are found to have the particle size distribution recorded in Table I.

For purposes of comparison, the particle size distribution of spheroidal polymer beads (Sample No. C) prepared using conventional suspension polymerization techniques is also set forth in Table I.

TABLE I

| Particle Size (Diameter), mm | Particle Size Distribution, Volume %[1] | |
|---|---|---|
| | Sample No. C* | Sample No. 1 |
| >1.0 | 1.8 | — |
| 0.84–1.0 | 2.8 | 2.4 |
| 0.71–0.83 | 3.6 | 1.8 |
| 0.59–0.70 | 13.4 | 2.7 |
| 0.50–0.58 | 40.0 | 90.9 |
| 0.42–0.49 | 27.0 | 1.6 |
| 0.35–0.41 | 7.0 | 0.3 |
| <0.35 | 4.4 | 0.3 |

*Not an example of this invention.
[1]Volume percent of the spheroidal polymer beads within the specified size range as determined by conventional screening techniques employing U.S. Standard Sieve Series screens.

As evidenced by the particle size distribution recorded in Table I, the beads prepared by the present invention (Sample No. 1) exhibit excellent uniformity, particularly when compared to conventionally prepared beads (Sample No. C).

EXAMPLE 2

In a similar manner, spheroidal polymer beads are prepared using 92 parts styrene, 0.3 part ethylvinylbenzene and 0.3 part divinylbenzene. The volume average particle size of these beads is found to be about 0.67 mm and over 75 volume percent of the beads are found to have a particle size from about 0.59 to about 0.74.

EXAMPLE 3

Following the procedure employed in preparing Sample No. 1 of Example 1, a monomer mixture of 84 parts styrene, 8 parts of divinylbenzene, 8 parts of ethylvinylbenzene and 0.3 part of a peroxygen type free radical initiator are flowed through an orifice plate having 5 openings, each opening having a diameter of about 0.4 mm and a length of 0.1 mm (L/d=0.25) at a Reynolds number of 484 into a suspending medium of an aqueous solution of 0.05 weight percent carboxymethyl methylcellulose. The resulting laminar jets of the monomer mixture are vibrated at a Strouhal number of about 0.83, which corresponds to a frequency of about 440 cycles per second. The monomer droplets flow from the column into the polymerization vessel to form a suspension comprising from about 55 volume percent of the monomer droplets. The monomer is polymerized by heating the reactor for 12 hours at 75° C. and an additional 9 hours at 95° C. and the resulting beads are filtered. As evidenced by Table II, the beads are found to have a particle size of exceptional uniformity.

TABLE II

| Particle Size (Diameter), mm | Particle Size Distribution, Vol. %[1] |
|---|---|
| >1.68 | 2.3 |
| 1.41–1.68 | 0.8 |
| 1.19–1.40 | 1.0 |
| 1.0–1.18 | 5.0 |
| 0.84–0.99 | 28.5 |
| 0.71–0.83 | 61.1 |
| 0.59–0.70 | 0.6 |
| <0.59 | 0.7 |

EXAMPLE 4

In a manner similar to that employed in preparing Sample No. 1 of Example 1, uniformly sized monomer droplets are formed by flowing a monomer mixture of 54 parts styrene, 5.6 parts divinylbenzene, 40 parts isooctane and 0.4 part of a peroxygen type free radical initiator through an orifice plate similar in all respects to the plate employed in Example 1 at flow characteristics defined by a Reynolds number of 520 and vibratorily exciting the resulting monomer jet at a St of 0.65. The monomer droplets flow from the column into a polymerization reactor until a suspension of about 50 volume percent of the monomer mixture is prepared. The monomer is then polymerized for 24 hours at 75° C. and an additional 8 hours at 95° C. and the resulting porous beads recovered using conventional filtration techniques. The particle size distribution of the resulting beads is determined using conventional dry screening techniques. The beads are found to have excellent uniformity, with 82.5 volume percent having a particle size between 0.5 and 0.71. These beads are suitably employed in the preparation of uniformly sized, macroporous (macroreticular) ion exchange resin.

EXAMPLE 5

In a manner similar to Example 1, generally uniform sized monomer droplets are formed by flowing a monomer mixture of 28 parts styrene, 4 parts divinylbenzene, 68 parts methyl methacrylate and 0.2 part of a peroxygen type free radical initiator through the orifice plate employed in Example 1 at flow characteristics having a Reynolds number of 340 and vibratorily exciting the resulting monomer jet at a St of 0.71. The monomer droplets flow from the column into a polymerization reactor until a suspension of about 55 volume percent of the monomer mixture is prepared. The monomer is then polymerized for 24 hours at 75° C. and an additional 8 hours at 95° C. and the resulting beads recovered using conventional filtration techniques. Using conventional wet screening techniques, the beads are found to have a narrow particle size distribution with 70 volume percent of the beads having a particle size between 0.50 and 0.70 mm.

EXAMPLE 6

Using a column similar in all respects to the column employed in Example 1, a monomer mixture comprising 99.56 parts styrene, 0.02 part of divinylbenzene, 0.02 part of ethylvinylbenzene, and 0.4 part of a free radical polymerization initiator is metered into a monomer reservoir at a constant rate of about 5.5 g/min. This mixture is jetted through the openings in an orifice plate, which plate has 14 openings having a diameter of 0.29 mm and a length of 0.1 mm (L/d of 0.34), to form a jet having laminar flow characteristics defined by a Reynolds number of about 409. To break the monomer jets into uniformly sized droplets, the jets are vibratorily excited at a Strouhal number of 0.43, which corresponds to a frequency of vibration of a constant 520 cycles per second. The resulting uniformly sized droplets rise through the column which comprises an aqueous solution of about 0.05 weight percent of a carboxymethyl methylcellulose suspending agent. Following an average residence time of about 100 seconds, the monomer droplets flow from the upper end of the column into a polymerization reactor, with continuous agitation, until a suspension comprising about 60 volume percent of the unpolymerized monomer droplets based on the volume of the monomer and continuous phases is obtained. Sufficient amounts of additional carboxymethyl methylcellulose are added to the polymerization reactor to make the total concentration of suspending agent about 0.3 percent based on the weight of the suspending medium.

The monomer is then polymerized by heating the reactor to about 85° C. for a period of about 12 hours, followed by heating the reactor for an additional 6 hours at about 95° C. while agitating the suspension at conditions which minimize the coalescence or additional dispersion of the droplets. At the end of this period, the resulting polymer beads are recovered free of the suspending medium using conventional filtration techniques and are subsequently dried. The dried beads are screened using conventional dry screening techniques and are found to have a particle size such that 82 percent by volume of the beads have a particle size from about 0.7 to about 0.84 mm.

The dry beads are resuspended in an aqueous solution of a carboxymethyl methylcellulose suspending agent contained by a pressure vessel. Fifteen parts of Freon 11 per 100 parts of polymer beads are subsequently added to the pressure vessel. The vessel is then heated to about 95° C. for 2 hours, followed by an additional 2 hours at 110° C. Following this period, the reactor is cooled to ambient temperatures, washed, recovered by conventional filtration techniques and dried. The resulting beads are found to expand by 58 volumes, with the expanded beads generally exhibiting the excellent uniformity of the polymer beads from which the expandable beads were prepared.

What is claimed is:

1. A method for preparing spheroidal polymer beads, said method comprising the steps of forming a monomer jet of a monomer phase comprising a polymerizable monomer having laminar flow characteristics by flowing the monomer phase through an opening into a continuous phase comprising a liquid immiscible with the polymerizable monomer or monomer phase and a stabilizing amount of a suspending agent; vibratorily exciting the jet to form a plurality of monomer droplets suspended in said continuous phase, transfering said suspended monomer droplets into a polymerization reaction vessel without significant coalescence or additional dispersion thereof, and substantially without the polymerization thereof, and subsequently polymerizing the monomer in suspension at conditions which do not cause significant coalescence or additional dispersion thereof.

2. The method of claim 1 wherein the monomer droplets have a particle size distribution such that the coefficient of variance of their particle size is less than about 0.1.

3. The method of claim 1 wherein the flow characteristics of the monomer jet is defined by a Reynolds number from about 1 to about 2,000 and the vibratory excitation of the monomer jet is defined by a Strouhal number from about 0.05 to about 5.

4. The method of claim 1 wherein the monomer droplets possess a different density than the continuous phase and the monomer droplets move through the continuous phase, substantially in the direction imparted to the monomer droplets by the difference in density between the monomer droplets and the continuous phase into a polymerization reaction vessel, said continuous phase being stationary or being flowed in the direction of the flow of the monomer droplets in a cocurrent flow operation.

5. The method of claim 4 wherein the flow rates of the continuous phase and the monomer jets are chosen such that the suspension of monomer droplets in the polymerization reaction vessel comprises from about 30 to about 60 volume percent of monomer droplets.

6. The method of claim 1 wherein the polymerization reaction vessel is agitated using an anchor, gate or loop-type agitator.

7. The method of claim 4 wherein the flow of the monomer jet is described by a Reynolds number from about 1 to about 1,200 and the vibratory excitation of the monomer jet is defined by a Strouhal number from about 0.15 to about 1.5, wherein said flow characteristics and conditions of vibratory excitement are such that the monomer droplets exhibit a particle size distribution with a coefficient of variance of less than about 0.05.

8. The method of claim 7 wherein the size of the monomer droplets is from about 0.15 to about 1.5 mm.

9. The method of claim 3 wherein the monomer jet is formed by flowing the monomer through a passage in a jet forming means, said passage having an opening with a diameter from about 0.06 to about 0.6 mm.

10. The method of claim 9 wherein a plurality of monomer jets is formed by flowing the monomer through an orifice plate having a plurality of generally cylindrical or frusto-conical passages, each passage having a cross-section with a diameter from about 0.08 to about 0.4 mm.

11. The method of claim 7 wherein the viscosity of the continuous phase is less than 50 cps at room temperature and from about 0.1 to about 10 times the viscosity of the monomer phase.

12. The method of claim 7 wherein the polymerizable monomer is a suspension polymerizable, water-insoluble monomer.

13. The method of claim 12 wherein the water-insoluble monomer is a monovinylidene aromatic, a polyvinylidene aromatic, a halo-olefin, an ester of an $\alpha,\beta$-ethylenically unsaturated carboxylic acid or a mixture of two or more of said monomers.

14. The method of claim 13 wherein the monovinylidene aromatic is styrene or an alkyl substituted styrene and the polyvinylidene aromatic is divinylbenzene.

15. The method of claim 14 wherein the spheroidal polymer beads are subsequently converted to an ion exchange resin.

16. The method of claim 15 wherein the spheroidal polymer beads are sulfonated to form a strong acid cation exchange resin.

17. The method of claim 15 wherein the spheroidal polymer beads are halomethylated and subsequently aminated with ammonia or a primary or secondary amine to form a weak base anion exchange resin.

18. The method of claim 15 wherein the spheroidal polymer beads are halomethylated and subsequently aminated with a tertiary amine to form a strong base anion exchange resin.

19. The method of claim 13 wherein the monomer phase further comprises a free-radical, polymerization initiator and the continuous phase comprises an aqueous liquid containing a stabilizing amount of a suspending agent.

20. The method of claim 19 wherein said suspending agent is a water-soluble polymeric suspending agent which forms a film around the monomer droplets, which film exhibits an interfacial tension of at least 3 dynes/cm.

21. The method of claim 20 wherein the monomer droplets have a volume average diameter greater than about 400 microns and the water-soluble polymeric suspending agent forms a film around said droplets having an interfacial tension of at least 8 dynes/cm.

22. The method of claim 20 wherein the suspending agent is polyvinyl alcohol.

23. The method of claim 21 wherein the suspending agent is carboxymethylmethylcellulose.

24. The method of claim 13 wherein the monomer phase further comprises a pore-forming material comprising an inert organic liquid in which the monomer is soluble but the resulting polymer is insoluble.

25. The method of claim 7 wherein the polymerizable monomer is a water-soluble monomer and the monomer phase contains sufficient amounts of water to solubilize the polymer.

26. The method of claim 25 wherein the monomer is an ethylenically unsaturated carboxamide; an aminoalkyl ester of a carboxylic acid or anhydride or an ethylenically unsaturated carboxylic acid.

27. The method of claim 26 wherein the monomer phase further comprises a free-radical, polymerization initiator and the continuous phase comprises an aromatic or aliphatic hydrocarbon or a halogenated hydrocarbon containing a stabilizing amount of a suspending agent.

28. The method of claim 7 wherein a polymerizable monomer is imbibed within the spheroidal polymer beads and the imbibed monomer subsequently polymerized.

29. An apparatus for preparing spheroidal polymer beads which comprises (1) a monomer reservoir containing a monomer phase comprising a polymerizable monomer, (2) a column containing a continuous phase of a suspending liquid immiscible with the polymerizable monomer or monomer phase and a stabilizing amount of a suspending agent, (3) a jet forming means in intimate contact with the monomer phase comprising the polymerizable monomer and the continuous liquid phase and having a passage connecting the monomer reservoir with the column containing the continuous phase such that the monomer phase is capable of flowing as a jet having laminar flow characteristics therethrough into the continuous phase, (4) a vibratory exciter capable of exciting the monomer jet such that the jet is broken into droplets and (5) a means for polymerizing the monomer in suspension at conditions such that significant coalescence or additional dispersion of the droplets does not occur.

30. The apparatus of claim 29 which further includes a means for introducing the suspending liquid into the column containing the continuous phase in close proximity to the jet forming means such that the monomer droplets and continuous phase flow through the column in an essentially cocurrent manner.

31. The apparatus of claim 30 wherein the jet forming means is an orifice plate having a plurality of generally cylindrical or frusto-conical passages, each passage having a cross-section of a diameter from about 0.08 to about 0.4 mm.

32. The apparatus of claim 31 wherein each passage of the orifice plate is spaced sufficiently apart such that the formation mechanism of the droplets is not significantly and deleteriously affected by an adjacent laminar flow jet and droplet formation therefrom.

33. The apparatus of claim 32 wherein each passage has a length less than about 10 times the diameter and wherein each passage is spaced at least about 1 mm and about 20 times the passage diameter from the passage nearest thereto when said distance is measured from the center of each passage.

34. The method of Claim 1 wherein the polymerization reaction vessel is agitated.

* * * * *